United States Patent
Günther et al.

(10) Patent No.: US 11,027,468 B2
(45) Date of Patent: Jun. 8, 2021

(54) MANIFOLD DEVICE FOR AN INJECTION MOLDING NOZZLE, INJECTION MOLDING NOZZLE WITH MANIFOLD DEVICE AND INJECTION MOLDING TOOL WITH INJECTION MOLDING NOZZLE AND MANIFOLD DEVICE

(71) Applicant: GÜNTHER Heisskanaltechnik GmbH, Frankenberg (DE)

(72) Inventors: Herbert Günther, Allendorf (DE); Siegrid Sommer, Burgwald (DE); Torsten Schnell, Lichtenfels (DE)

(*) Notice: Subject to any disclaimer, the term of this patent is extended or adjusted under 35 U.S.C. 154(b) by 314 days.

(21) Appl. No.: 16/015,374

(22) Filed: Jun. 22, 2018

(65) Prior Publication Data
US 2018/0370103 A1    Dec. 27, 2018

(30) Foreign Application Priority Data

Jun. 22, 2017   (DE) .................... 10 2017 113 885.4

(51) Int. Cl.
*B29C 45/20*     (2006.01)
*B29C 45/27*     (2006.01)

(52) U.S. Cl.
CPC ............ *B29C 45/20* (2013.01); *B29C 45/278* (2013.01); *B29C 45/2725* (2013.01); *B29C 45/2735* (2013.01)

(58) Field of Classification Search
CPC ... B29C 45/20; B29C 45/2735; B29C 45/278; B29C 45/2725; B29C 45/2701; B29C 45/30
See application file for complete search history.

(56) References Cited

U.S. PATENT DOCUMENTS

| 9,610,722 B2 | 4/2017 | Iwasawa | |
|---|---|---|---|
| 2007/0082083 A1* | 4/2007 | Fairy | B29C 45/2806 425/564 |
| 2011/0287129 A1* | 11/2011 | Klobucar | B29C 45/2703 425/548 |

FOREIGN PATENT DOCUMENTS

| CN | 2199437 Y | 5/1995 |
|---|---|---|
| CN | 2571008 Y | 9/2003 |
| CN | 103786315 A | 5/2014 |
| CN | 105402005 A | 3/2016 |

(Continued)

OTHER PUBLICATIONS

Foreign communication from a related application—Supplementary European Search Report of European Patent Application No. 18179185.6, dated Nov. 6, 2018, in German language, 7 pages.

(Continued)

*Primary Examiner* — Joseph S Del Sole
*Assistant Examiner* — Jamel M Nelson
(74) *Attorney, Agent, or Firm* — Keith C. Rawlins

(57) ABSTRACT

A manifold device for an injection-molding nozzle for an injection-molding tool has a main manifold channel for an injection-molding compound, which main manifold channel extends from an inlet opening into the manifold device as far as at least two transfer openings, and at least two manifold channels for the injection-molding compound, which manifold channels each extend from a transfer opening to an outlet opening and are each fluidically connected by a transfer opening to the main manifold channel. Also disclosed are an injection-molding nozzle with such a manifold device and an injection-molding tool with such an injection-molding nozzle.

12 Claims, 6 Drawing Sheets

(56) References Cited

FOREIGN PATENT DOCUMENTS

| | | |
|---|---|---|
| CN | 205691423 U | 11/2016 |
| CN | 106626260 A | 5/2017 |
| DE | 19802048 A1 | 7/1999 |
| DE | 102007059545 A1 | 7/2008 |
| DE | 202008005073 U1 | 7/2008 |
| EP | 1524091 A2 | 4/2005 |
| EP | 2177339 A1 | 4/2010 |
| JP | 55140537 A | 11/1980 |
| JP | S5844067 B2 * | 9/1983 ......... B29C 45/2735 |

OTHER PUBLICATIONS

Foreign communication from a related application—Office Action of German Patent Application No. 10 2017 113 885.4, (in German language), dated Jan. 10, 2018, 5 pages.

Foreign Communication from a related application—Office Action of Chinese Patent Application No. 20180722854.9 dated Sep. 1, 2020, 11 pages—Translation.

* cited by examiner

MANIFOLD DEVICE FOR AN INJECTION MOLDING NOZZLE, INJECTION MOLDING NOZZLE WITH MANIFOLD DEVICE AND INJECTION MOLDING TOOL WITH INJECTION MOLDING NOZZLE AND MANIFOLD DEVICE

CROSS-REFERENCE TO RELATED APPLICATIONS

This Application claims priority to German Patent Application No. 10 2017 113 885.4 filed Jun. 22, 2017, which is incorporated by reference herein in its entirety.

FIELD OF INVENTION

The invention relates to a manifold device for an injection-molding nozzle of an injection-molding tool. The invention further relates to an injection-molding nozzle with such a manifold device and to an injection-molding tool with such an injection-molding nozzle.

BACKGROUND

In the production of plastic parts with the aid of injection-molding techniques, it is often advantageous to inject the mold cavities from the side. Injection-molding nozzles and injection-molding tools suitable for this purpose are therefore known in different configurations in the prior art.

DE 20 2008 005 073 U1, for example, discloses a hot-runner nozzle for lateral injection of plastic components, with a multi-part nozzle body in which a melt channel is formed which, in the lower region of the nozzle body, branches into several subsidiary channels extending obliquely outward. Inside a recess in the nozzle body, each subsidiary channel opens out in an oblique surface on which a tip insert is mounted. The latter has a main body with an oblique sealing surface in which an inlet opening for the subsidiary channel is formed. Furthermore, the nozzle body has a cylindrical portion, at the end of which the mouthpiece is formed. The tip inserts are oriented radially outward with the mouthpieces.

EP 1 524 091 A2 likewise describes an injection-molding nozzle for an injection-molding tool with a material tube in which the end of an axially extending flow channel is divided up into several deflection channels which are oriented obliquely outward. These deflection channels open into radially arranged lateral recesses which are formed in a side wall of the material tube. Located in the bottom of the material tube is a further polygonal recess, which is connected by radial bores to the lateral recesses of the material tube and via these recesses to the circumferential surface of the material tube. Outwardly directed mouthpieces are plugged into the radial bores and are secured inside the recess by a fastening element. The mouthpieces protrude from the circumferential surface of the material tube and, inside the radial openings, the free-flowing compound emerging from the deflection channels flows around the mouthpieces.

Here too, the deflection channels have to be introduced from underneath as oblique bores into the material tube, which is complicated in terms of manufacturing technology. A further disadvantage of the above-described injection-molding nozzle is that the number and the arrangement of the mouthpieces are not variable, since these are fixed by the number and the arrangement of the deflection channels and through-bores formed in the material tube. The injection-molding nozzle cannot therefore be adapted to different types of tasks, for example if the number and/or the spacing of the gate points changes. Accordingly, the nozzle can be used only to a limited extent, and a special material tube has to be produced for each injection-molding tool, which is in turn associated with high costs.

In order to simplify the construction of such an injection-molding nozzle, EP 2 177 339 A1 proposes that each nozzle tip is arranged in a receiving device which is formed separately from the nozzle body, and that each nozzle tip can be held releasably in the separate receiving device with the aid of a manifold device configured as a holding element. The holding element has a main manifold channel, which continues the flow channel of the nozzle body and divides up into several manifold channels and directs the injection-molding compound to be processed to the mouthpieces via outlet openings. The manifold channels extend in a star shape from the main manifold channel.

The possible number of manifold channels is limited, however, since the wall thickness between the manifold channels, particularly in the region of the transfer openings from the main manifold channel to the manifold channels, decreases as the number of manifold channels increases, as a result of which the stability of the manifold device decreases starting from a defined number of manifold channels. With a large number of manifold channels, these would also overlap each other in the region of the transfer openings, which would result in further material weakness. An increase in the number of manifold channels would therefore be possible only with an increase in the diameter or circumference of the main manifold channel, so as to be able to provide a sufficiently large surface area, in the circumferential direction, for the arrangement of the transfer openings.

SUMMARY OF INVENTION

The object of the invention is to make available a manifold device for an injection-molding nozzle, an injection-molding nozzle and an injection-molding tool, which have improved stability.

The disclosure includes a manifold device, an injection-molding nozzle with the manifold device, and an injection-molding tool having such an injection-molding nozzle.

In a manifold device for an injection-molding nozzle for an injection-molding tool, with a main manifold channel for an injection-molding compound, which main manifold channel extends from an inlet opening into the manifold device as far as at least two transfer openings, and with at least two manifold channels which each extend from a transfer opening to an outlet opening and are each fluidically connected by a transfer opening to the main manifold channel, the invention proposes that the transfer openings open into the main manifold channel at least two different heights in the longitudinal direction of the main manifold channel.

Advantageously, the manifold channels thus do not extend away from the main manifold channel on a common plane, but instead at different heights in the longitudinal direction. In this way, the spacing of the individual manifold channels, in particular the spacing of manifold channels that are adjacent in the circumferential direction, hence the wall thickness between the manifold channels, can have greater dimensions. On account of the greater material thickness between the manifold channels, the manifold device is more stable while having the same number of manifold channels, or more manifold channels can be provided for the same stability. Furthermore, the main manifold channel can have a smaller circumference, since fewer transfer openings are arranged on one plane in the circumferential direction or since the transfer openings can be arranged not only in the circumferential direction but also in the longitudinal direction of the main manifold channel.

Transfer openings adjacent in circumferential direction are preferably arranged at different heights. The adjacent transfer openings preferably open into the main manifold channel at different heights. This ensures that manifold channels that are adjacent in the circumferential direction are not located at one height, in which case the spacing between these manifold channels would be very small, which would lead to a reduced wall thickness in this region.

The transfer openings can be arranged in any desired way on the outer circumference of the main manifold channel. Preferably, however, they are arranged in a regular and repeating pattern in the circumferential direction, preferably at the same angle spacing, such that a uniform stability of the manifold device is ensured. For example, the transfer openings are arranged on two planes spaced apart from each other in the longitudinal direction of the main manifold channel, wherein the transfer openings of manifold channels adjacent in the circumferential direction lie in different planes.

In a further advantageous embodiment of the disclosure, provision is made that the transfer openings do not overlap on the inner circumference of the main manifold channel. This applies both to the transfer openings arranged in one plane and also to the transfer openings arranged in different planes.

In a further advantageous embodiment of the disclosure, the number of the transfer openings that open into the main manifold channel on one plane is the same, such that the transfer openings of the manifold channels lie alternately in the first and second plane in the circumferential direction.

The planes in which the transfer openings open into the main manifold channel can be arranged in any desired manner. The planes are preferably arranged parallel to each other, such that the spacing of the transfer openings adjacent in the circumferential direction is at all times the same in the longitudinal direction. Preferably, the planes are also arranged perpendicular to the longitudinal direction of the main manifold channel.

The outlet openings can be located, in the longitudinal direction of the main manifold channel, between the planes of the transfer openings. That is to say, the manifold channels whose transfer openings are located in one of the two planes can ascend in the longitudinal direction from the outlet openings to the transfer openings. The manifold channels whose transfer openings are located in the other of the two planes ascend from the transfer openings in the direction of the outlet openings counter to the longitudinal direction. Manifold channels adjacent in the circumferential direction thus ascend in opposite directions from the outlet openings to the transfer openings, as a result of which they move away from each other in the longitudinal direction. The transfer openings of these manifold channels are thus as far as possible from each other, such that the greatest possible wall thickness is provided between the manifold channels.

The outlet openings can be arranged in any desired manner. However, the outlet openings are preferably arranged in one plane. This affords the advantage that a melt flow through the main manifold channel and the manifold channels is largely constant for all possible paths.

The plane of the outlet openings can be arranged perpendicular to the longitudinal direction of the main manifold channel, such that the distance of the outlet openings from the transfer openings of one plane is at all times the same in the longitudinal direction.

For example, the outlet openings are distributed uniformly in the circumferential direction on one plane. Such a symmetrical configuration facilitates assembly of the manifold device, since the aligning of the manifold device is easier.

The distances of the outlet openings from the two planes of the transfer openings can be of the same order in the longitudinal direction of the main manifold channel. That is to say, the outlet openings are located centrally between the planes of the transfer openings. In this way, the manifold channels have substantially the same angle or the same inclination to the first and second plane and to the longitudinal direction.

Optionally, the position of the output openings can also be chosen such that the length of the flow path is the same for all manifold channels. For example, the manifold channels whose transfer openings are farther away from the inlet opening can be shorter by the order of the distance of the transfer openings which lie nearer the inlet opening. In this way, the flow time of the injection-molding compound through all the manifold channels is of the same length. If the injection-molding compound cools inside the injection-molding nozzle, the flow paths of equal length have the effect that the injection-molding compound emerges at the same temperature from all the outlet openings.

The outlet openings are preferably uniformly distributed in the circumferential direction with respect to the main manifold channel, in order to avoid material weaknesses on account of adjacent channels lying too close to each other.

The manifold device has a polygonal shape for example, wherein each outlet opening is provided on a partial surface of the polygonal outer shape. In combination with a suitably shaped receiver on the injection-molding nozzle, the polygonal outer shape forms an anti-rotation means or centering aid for the manifold device. The manifold device preferably has a regular polygonal outer shape, wherein the outlet openings are each provided at the same position of a partial surface. In this way, the manifold device can be inserted in any desired manner into the receiver, as long as the polygonal outer shape is oriented according to the receiver.

The manifold device can be configured tapering conically toward the inlet opening counter to the longitudinal direction, such that it is centered when pushed into the receiver or is clamped when pushed into a receiving device. Optionally, however, the manifold device can also have, in the longitudinal direction, an outer cross section that remains constant at least in part.

Receivers for mouthpieces of the injection-molding nozzle are provided for example at each of the outlet openings, in which receivers the mouthpieces can be held or fixed. According to one embodiment, the mouthpieces can be fixable in the receivers.

Optionally, a neck portion can be provided which protrudes counter to the longitudinal direction and at which the inlet opening is provided.

The object is further achieved by provision of an injection-molding nozzle for an injection-molding tool, with a nozzle body and with at least two mouthpieces which are each fluidically connected, via an outlet opening, to a mold cavity of the injection-molding tool formed in a mold insert, wherein a flow channel for an injection-molding compound to be processed is formed in the nozzle body, and with an above-described manifold device. The flow channel opens into the main manifold channel of the manifold device and the manifold channels each open into a mouthpiece.

The mouthpieces are arranged, for example, in a receiving device formed separately from the nozzle body, and the manifold device forms a holding element that secures the mouthpieces releasably in the separate receiving device.

By virtue of this arrangement, it is possible for the mouthpieces to be exchanged quickly and conveniently at any time, without having to disassemble the whole injection-molding nozzle. In addition, there is the possibility of completely exchanging the receiving device that is formed separately from the nozzle body. In this way, with only a few maneuvers, the injection-molding nozzle can be adapted to different tasks and requirements. For example, the spacing or the position of the mouthpieces can be changed at any time. Moreover, the number of the mouthpieces can be conveniently increased, simply by mounting a corresponding receiving device on the nozzle body. For this purpose, the previous receiving device simply has to be detached from the nozzle body and a new or other receiving device mounted. Dismantling the whole nozzle is not necessary, which favorably influences the set-up time of the injection-molding installation. Tool costs are also considerably reduced, because the rest of the injection-molding nozzle can always be reused.

The manifold device can extend through the receiving device and can be guided longitudinally displaceably in the nozzle body. In this way, the receiving device is connected to the nozzle body via the manifold device, but without any rigid or fixed connection. Rather, the manifold device is able to move relative to the nozzle body, such that the different thermal expansions of the various components of the injection-molding nozzle during heating and cooling of the tool are at all times compensated, without leaks occurring during operation.

For this purpose, the manifold device preferably has a neck portion which protrudes longitudinally displaceably into the flow channel of the nozzle body, wherein the main manifold channel is formed in the neck portion.

The receiving device can have a recess into which the manifold device is insertable. The recess has a polygonal inner face, for example, and the manifold device has a polygonal side face of the same shape. The inner face of the receiving device and the outer face or side face of the holding element thus in part have smooth and plane surfaces which permit a reliable and permanently leak tight arrangement of the mouthpieces inside the receiving device.

In order to receive the mouthpieces, the receiving device has bores which are transverse to the axial direction of the nozzle body and into which the mouthpieces can be inserted or plugged. The latter can therefore can be inserted into the receiving device from the inside, which likewise has a favorable effect on the handling of the injection-molding nozzle. The latter can be mounted in the tool even when the available space is limited, since the mouthpieces usually protruding beyond the outer dimensions of the nozzle body or of the nozzle housing can be inserted later. Divided tool plates are therefore not required.

During assembly, the mouthpieces are simply inserted through the radial bores of the receiving device from the direction of the inner face of the recess. Thereafter, the manifold device is inserted from below and engages with its neck portion through the receiving device into the flow channel of the nozzle body or of the material tube. A base portion of the holding element adjoining the neck portion secures the mouthpieces inside the receiving device, such that they are no longer able to move radially inward. The mouthpieces are therefore fixed in position inside the receiving device by the holding element.

Preferably, each mouthpiece inside the recess bears on the inner face of the receiving device and on the side face of the manifold device, wherein each mouthpiece rests sealingly on the side face of the holding element. The polygonal faces of receiving device and holding element ensure an optimal sealing effect. In addition to this, a seal can be provided between each mouthpiece and the manifold device in order to prevent injection-molding compound from escaping in these regions.

In a further important embodiment of the disclosure, the flow channel and/or the receiving device are provided with a heater. In this case, the latter can be a customary heating coil which is introduced into a groove in the outer circumference of the receiving device. It is therefore also possible to use a thick-film heater which is applied to one of the outer surfaces and/or inner surfaces of the receiving device. The heater prevents cooling of the injection-molding compound, such that the latter at all times has a temperature that is required for the processing.

Advantageously, the manifold device is arranged longitudinally displaceably in the receiving device. This affords the possibility of positioning the manifold device and/or the mouthpieces opposite the receiving device, for example in order to be able to align the mouthpieces with respect to the tool. For this purpose, an adjusting device for the manifold device is provided, which is preferably accessible from the outside.

In order to prevent undesired displacements of manifold device, nozzle body and receiving device relative to each other, it is advantageous if the manifold device and the material tube, or the receiving device and the manifold device, or the receiving device and the material tube, are secured against rotation relative to each other, i.e. an anti-rotation means is formed or arranged between the receiving device, the manifold device and/or the nozzle body. The mouthpieces, the manifold device and the receiving device can be a pre-assembled structural unit, which can be rapidly assembled.

The object is furthermore achieved by provision of an injection-molding tool with such an injection-molding nozzle.

BRIEF DESCRIPTION OF THE DRAWINGS

Further features, details and advantages of the invention will become clear from the wording of the claims and also from the following description of illustrative embodiments with reference to the drawings, in which:

DETAILED DESCRIPTION

Figure 1:
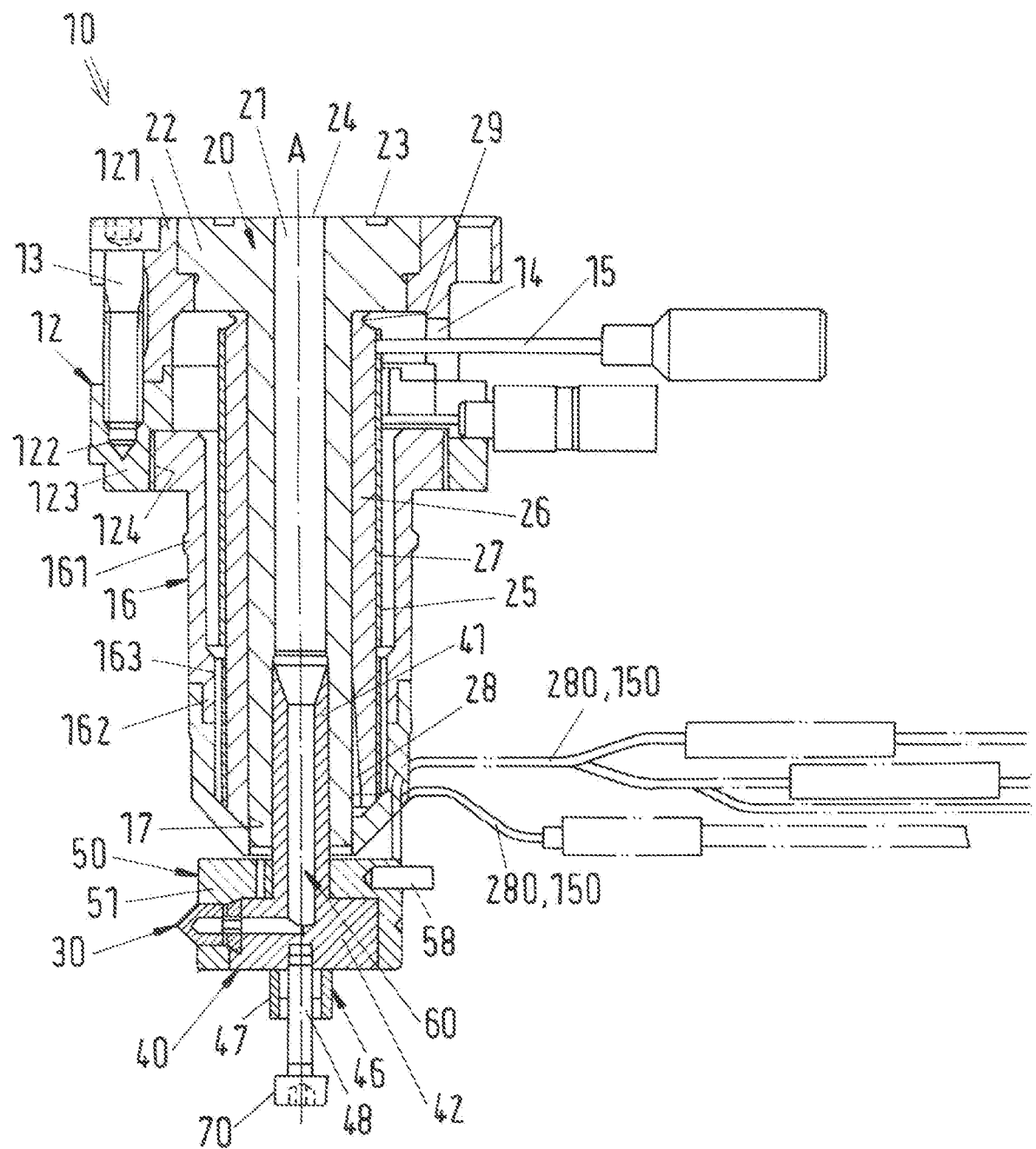
FIG. 1 shows a schematic sectional view of an embodiment of an injection-molding nozzle from the prior art.

The injection-molding nozzle 10 shown in FIG. 1 is intended for insertion into an injection-molding tool. The latter serves for producing molded parts from a free-flowing compound, for example from a polymer melt or the like. The injection-molding tool usually has a platen and, parallel to the latter, a manifold plate in which a system of flow channels is formed. These flow channels open into injection-molding nozzles 10, which are configured for example as hot runner nozzles.

The injection-molding nozzle 10 shown in FIG. 1 comprises a nozzle body 20 in the form of a material tube which, at its upper end, is provided with a flange-like attachment head 22 which is sealed off from the manifold plate (not shown) with the aid of a sealing ring 23. The material tube 20 sits releasably in a shaft 16. The shaft 16 and the attachment head 22 of the material tube 20 are in turn held by a housing 12. A flow channel 21 for a polymer melt is introduced centrally into the material tube 20 and extends in the axial direction A. The flow channel 21, preferably configured as a bore, has a material feed opening 24 in the attachment head 22, and the polymer melt arriving from the manifold plate is fed to the flow channel via said material feed opening 24.

It will be noted that the nozzle shown in FIG. 1 is a conventional hot runner nozzle. A manifold device 40, described in detail below, is inserted into the lower end of the material tube 20 and protrudes with a neck portion 41 longitudinally displaceably into the flow channel 21 of the material tube 20. The manifold device 40 serves to distribute the polymer melt and to secure mouthpieces 30 which are inserted in a star shape in a receiving device 50 formed separately from the nozzle body or the material tube 20. The manifold device 40 moreover has a base portion 42 which is insertable into the receiving device 50.

The receiving device 50 has a recess which is open at the bottom and into which the mouthpieces 30 and the manifold device 40 are inserted. While the neck portion 41 is arranged longitudinally displaceably in the flow channel 21 of the material tube 20, the base portion 42 is enclosed by the receiving device 50. Radial bores 51, in which mouthpieces 30 are arranged, are formed in this receiving device 50. The mouthpieces 30 are oriented transversely with respect to the axis A of the injection-molding nozzle 10 and are fluidically connected through the manifold device 40 to the flow channel 21 of the injection-molding nozzle 10.

A manifold device 40 for the injection-molding nozzle 10 shown in FIG. 1 is described in detail below with reference to FIGS. 2 to 6.

As can be seen in FIGS. 2 to 6, the basic set-up corresponds to the manifold device 40 shown in FIG. 1. In particular, the shape of the manifold device 40 and the arrangement of the inlet openings 61 and outlet openings 65 are the same. Therefore, in this manifold device 40 too, the outlet openings 65 are located at one height in the longitudinal direction L.

The manifold device 40 differs from the above-described manifold device 40 according to FIG. 1 in that the transfer openings 63 are arranged at different heights in the longitudinal direction L.

In an inner region of the base portion 42 in which a main manifold channel 62 lies, four manifold channels 64 are located on the circumference of the main manifold channel 62, at a height in the longitudinal direction L, the transfer openings 63 of said four manifold channels 64 lying in one plane 66a.

In the longitudinal direction L, four further manifold channels 64 are located on the circumference of the main manifold channel, at a different height, the transfer openings 63 of said further manifold channels 64 lying in a plane 66b.

The transfer openings 63 constitute a fluidic connection between the main manifold channel 62 and the respective manifold channel 64. The outlet openings 65 in the side faces 45 of the base portion 42 constitute a fluidic connection to mouthpieces 30 and to a receiving device 50 of the injection-molding nozzle 10.

Figure 6:
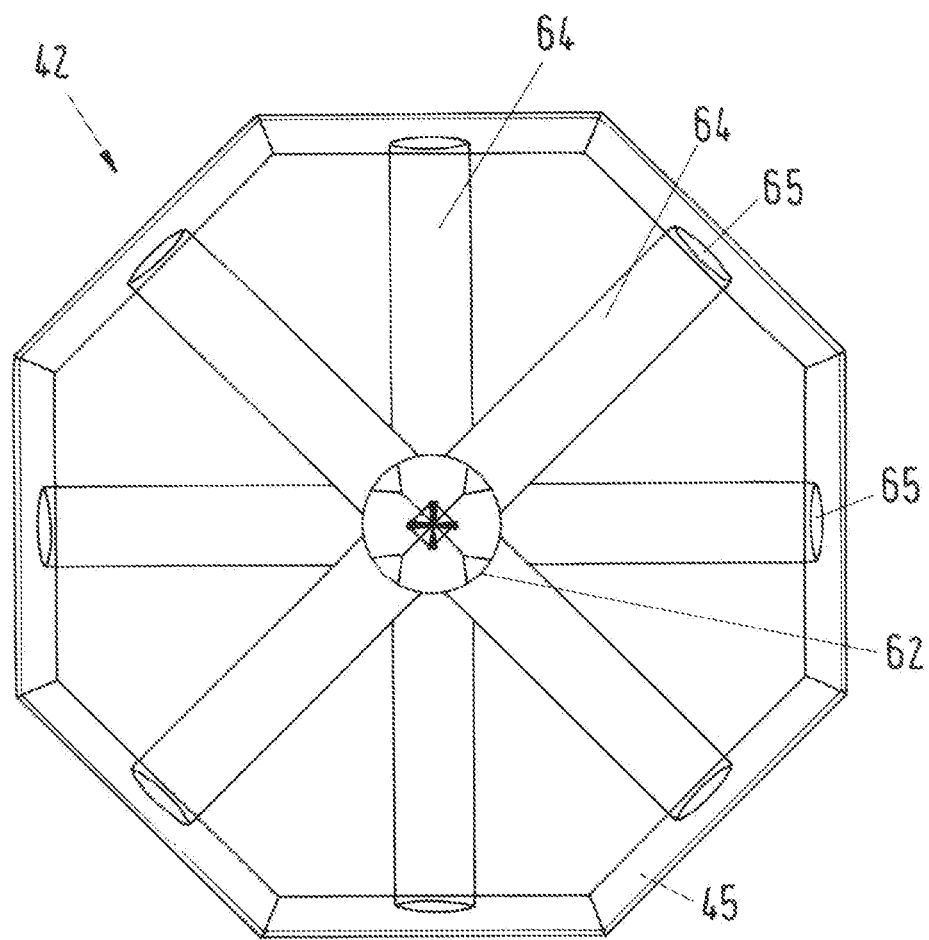
FIG. 6 shows a partially transparent sectional view of the manifold device according to the disclosure that is perpendicular to the longitudinal direction.

As can be seen from FIG. 6, the manifold channels 64 extend in a star shape from the main manifold channel 62, into which they open with the transfer openings 63. The manifold channels 64 then extend onward to the outlet openings 65, which are formed in the side faces 45 of the base portion 42.

Figure 4:
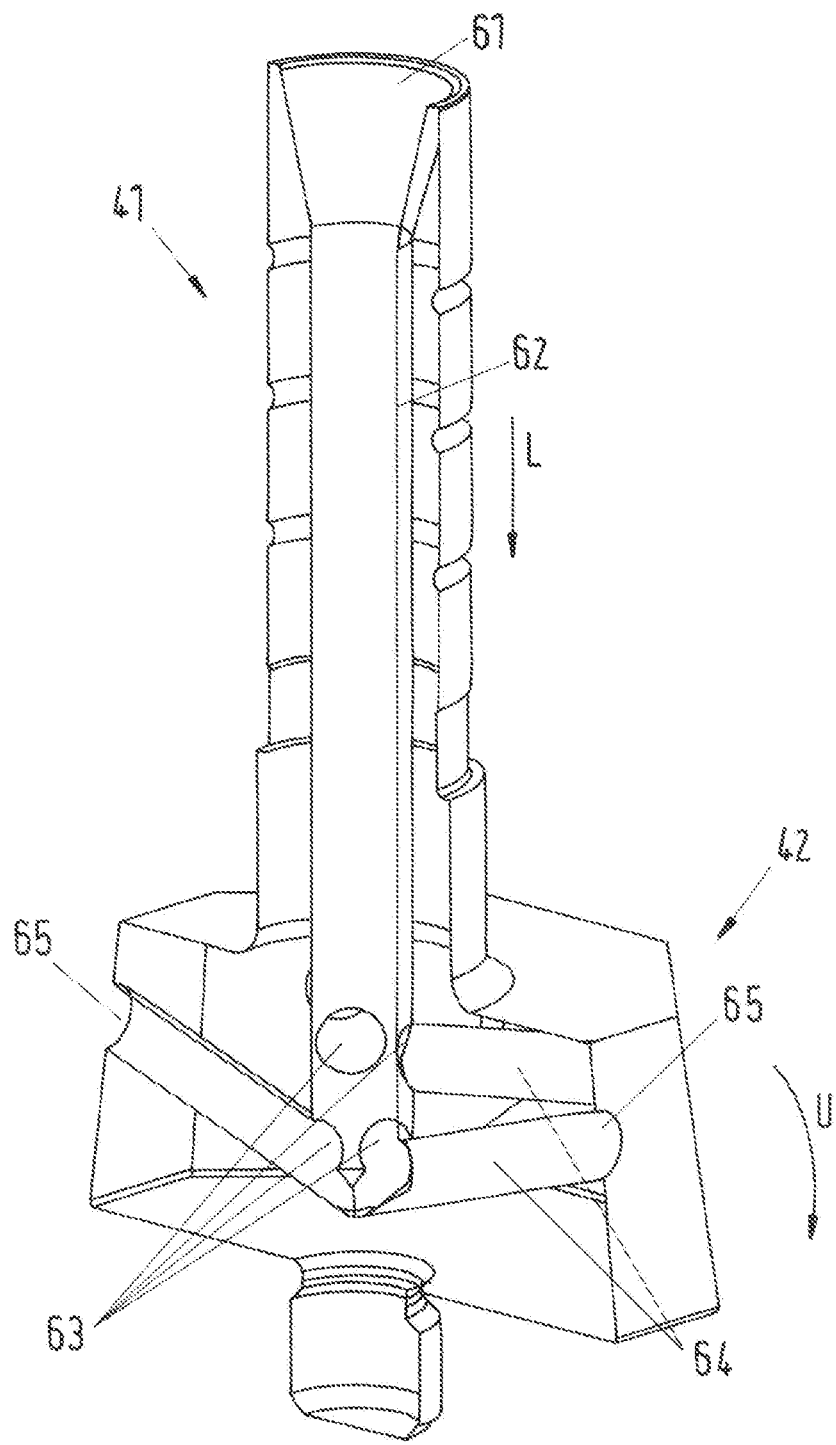
FIG. 4 shows a partially transparent sectional view of the manifold device according to the disclosure.
Figure 5:
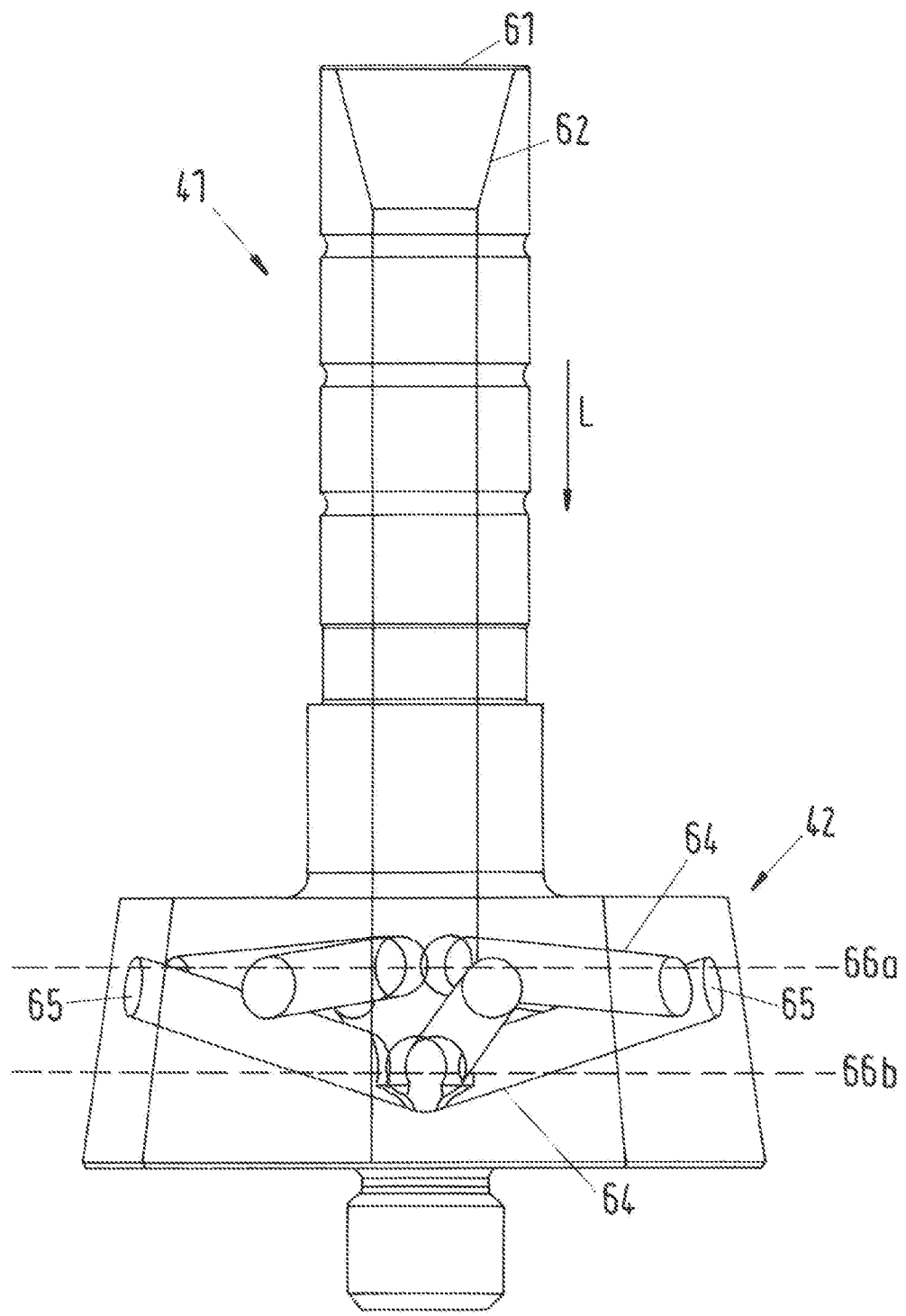
FIG. 5 shows a partially transparent side view of the manifold device according to the disclosure.

As can be seen in particular in FIGS. 4 and 5, the transfer openings are arranged at two different heights, i.e. on two planes 66a, 66b arranged perpendicular to the longitudinal direction L. The transfer openings 63 are arranged alternating in the circumferential direction U in one plane 66a of the two planes 66a, 66b and in the other plane 66b, such that transfer openings 63 that are adjacent in the circumferential direction U are not arranged at one height with respect to the longitudinal direction L.

The manifold device 40 thus has a greater wall thickness between adjacent manifold channels 64, particularly in the inner region of the base portion 42, such that the manifold device 40 is more stable and, for example, is able to withstand higher pressures.

The planes 66a, 66b are parallel to each other, such that the transfer openings 63 are arranged at precisely two heights with respect to the longitudinal direction L. Alternatively, however, the planes 66a, 66b can also be inclined with respect to the longitudinal direction L, in particular with different angles to the longitudinal direction L.

Furthermore, the plane in which the outlet openings 65 are located is parallel to the planes 66a, 66b, such that the outlet openings 65 are at the same distances from the respective planes 66a, 66b in the longitudinal direction L. The distances of the outlet openings 65 from the first plane 66a may differ from the distances of the outlet openings 65 from the second plane 66b.

Figure 3:
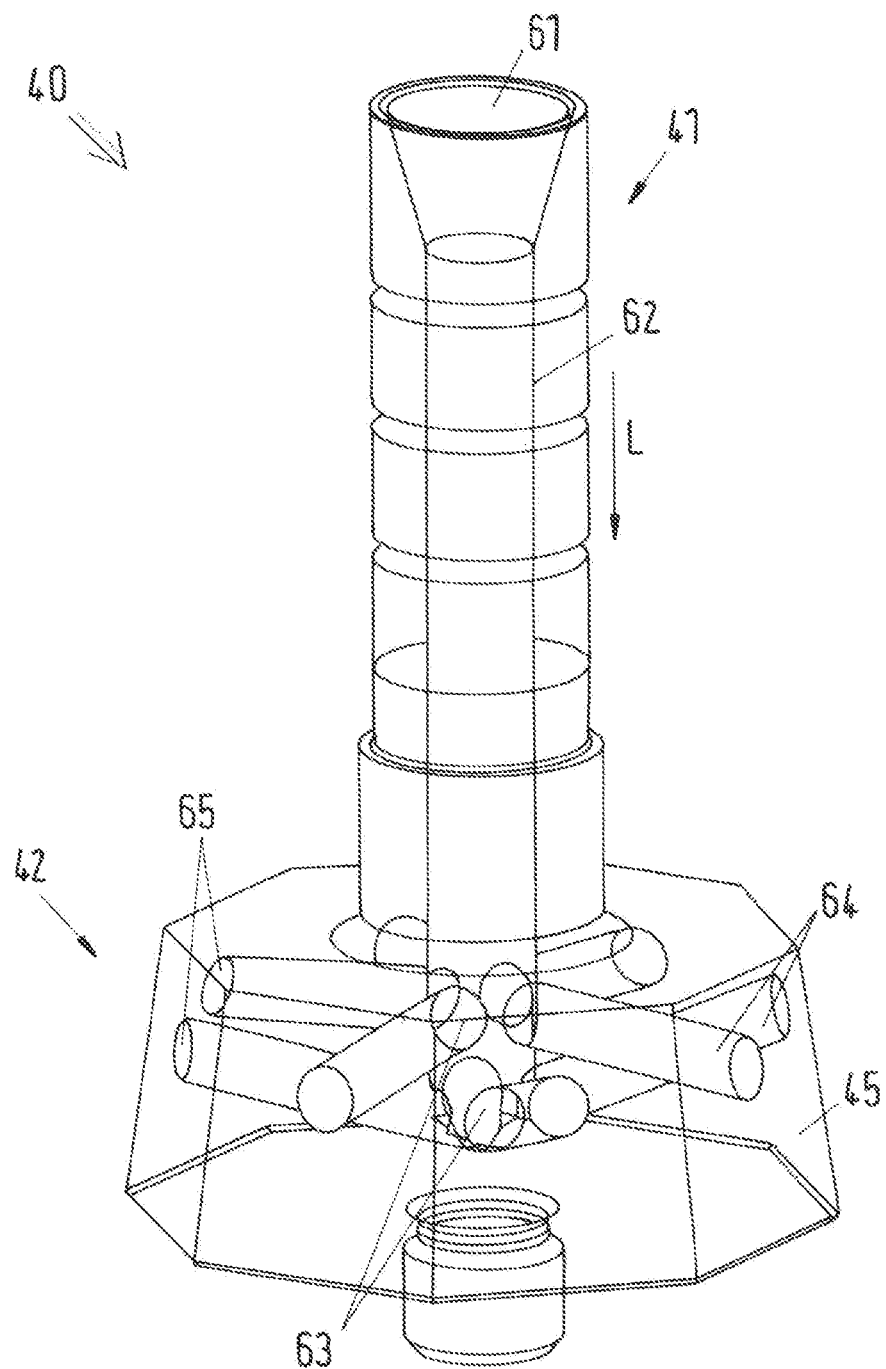
FIG. 3 shows a partially transparent view of the manifold device according to FIG. 2.

Furthermore, the manifold channels 64 whose transfer openings 63 are arranged in the first plane 66a and the second plane 66b, respectively, may be inclined at different angles with respect to the longitudinal direction L and to the planes 66a, 66b (see FIGS. 3 to 5 in particular).

Figure 2:
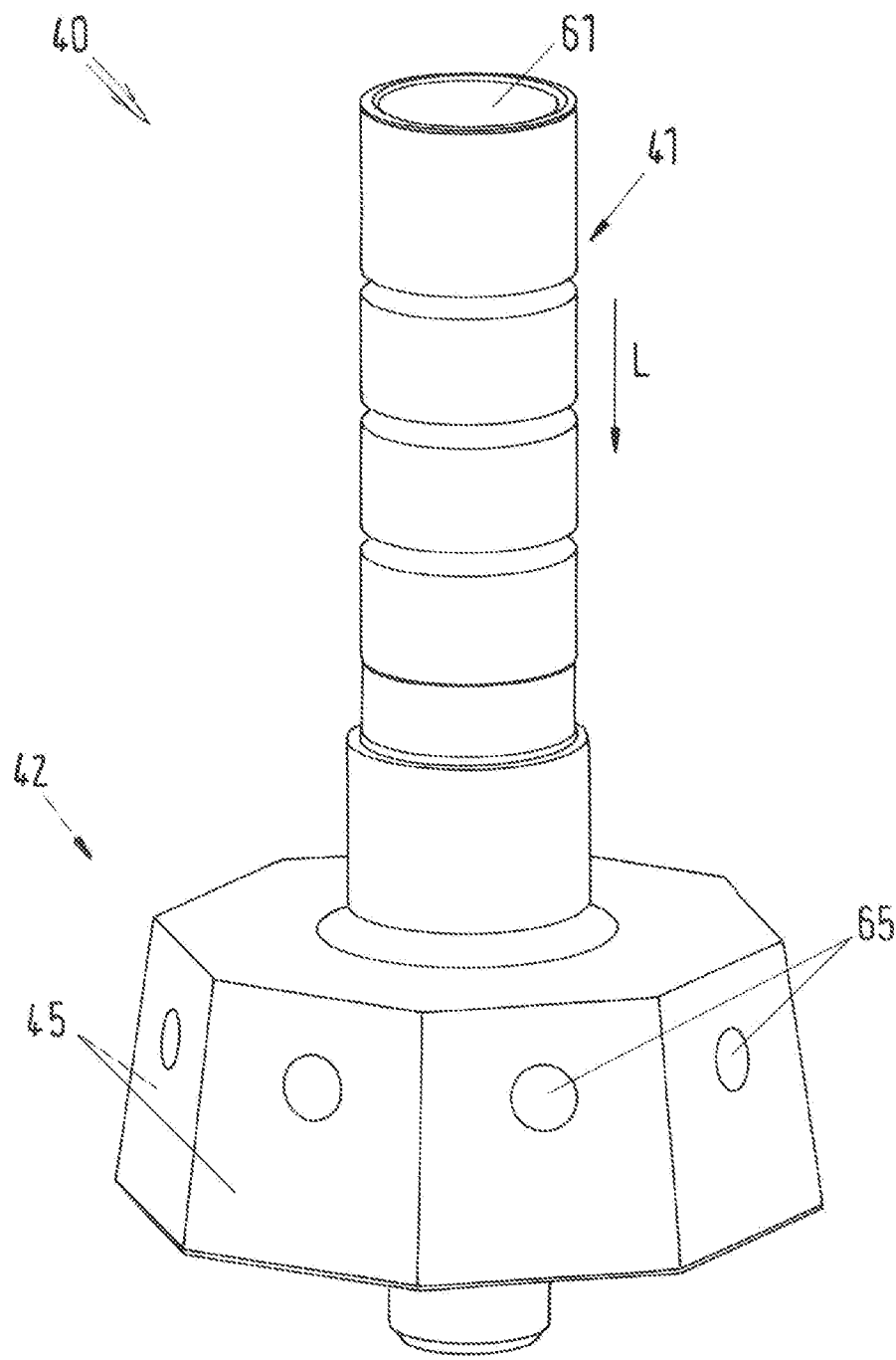
FIG. 2 shows a perspective external view of the manifold device according to the disclosure.

As can be seen in particular in FIG. 2, the side faces 45 are inclined with respect to the longitudinal direction L, such that the manifold device 40 is configured tapering conically counter to the longitudinal direction L.

In a departure from this arrangement, the side faces 45 can also extend in the longitudinal direction L, such that the manifold device 40 has a constant cross section at least in part in the longitudinal direction L.

The invention is not limited to one of the above-described embodiments and instead is modifiable in many ways. For example, a manifold device 40 with the above-described set-up, in which the transfer openings 63 open into the main manifold channel 62 in at least two planes 66a, 66b, can also be used for other injection-molding nozzles or injection-molding tools, e.g. for a cold runner nozzle. Moreover, it is possible to provide more than two planes 66a, 66b for the transfer openings 63, wherein it is not necessarily the case that four transfer openings 63 lie in each plane 66a, 66b of the transfer openings 63, and instead any desired number of transfer openings 63 can be provided in each plane 66a, 66b.

In a further embodiment, the outlet openings 65 do not all have to lie on one plane. The outlet openings 65 can be positioned in any desired manner on the side faces 45 of the base portion 42. In particular, they also do not have to be uniformly distributed.

Furthermore, the transfer openings 63 can also be arranged at more than two heights with respect to the longitudinal direction L. It is advantageous if two transfer openings 63 adjacent in the circumferential direction U do not lie at one height, such that the openings 63 do not overlap and a sufficient wall thickness is present between the manifold channels 64.

Moreover, the outlet openings 65 can have receivers in which the mouthpieces 30 of the injection-molding nozzle can be fixed.

It will be noted that a manifold device 40 for an injection-molding nozzle 10 for an injection-molding tool has a main manifold channel 62 for an injection-molding compound, which main manifold channel 62 extends from an inlet opening 61 into the manifold device 40 as far as at least two transfer openings 63, and at least two manifold channels 64 for the injection-molding compound, which manifold channels 64 each extend from a transfer opening 63 to an outlet opening 65 and are each fluidically connected by a transfer opening 63 to the main manifold channel 62. In order to increase the stability of the manifold device and to improve the flow conditions inside the manifold device, the transfer openings 63 open into the main manifold channel 62 at least two different heights in the longitudinal direction L of the main manifold channel 62.

An injection-molding nozzle 10 for an injection-molding tool has a nozzle body 20 and at least two mouthpieces 30 which are each fluidically connected, via at least one outlet opening, to a mold cavity of the injection-molding tool formed in a mold insert, wherein a flow channel for an injection-molding compound to be processed is formed in the nozzle body, and an above-described manifold device, wherein the flow channel opens into the main manifold channel of the manifold device and the manifold channels each open into a mouthpiece 30.

All of the features and advantages that are disclosed by the claims, the description and the drawing, including structural design details, spatial arrangements and method steps, may be essential to the invention both on their own and in a wide variety of combinations.

LIST OF REFERENCE SIGNS

10 injection-molding nozzles
12 housing
16 shaft
20 nozzle body
21 flow channel
23 sealing ring
24 material feed opening
30 mouthpiece
40 manifold device
41 neck portion
42 base portion
50 receiving device
51 radial bores
61 inlet opening
62 main manifold channel
63 transfer opening
65 outlet opening
66*a* first plane
66*b* second plane
L longitudinal direction
U circumferential direction

What is claimed is:

1. A manifold device for an injection-molding nozzle for an injection-molding tool comprising: a main manifold channel for an injection-molding compound, which the main manifold channel extends from an inlet opening into the manifold device as far as at least two transfer openings, and with at least two manifold channels which each extend from a transfer opening to an outlet opening and are each fluidically connected by the transfer opening to the main manifold channel, characterized in that the at least two transfer openings open into the main manifold channel at at least two different heights in the longitudinal direction of the main manifold channel, wherein the at least two transfer openings open into the main manifold channel on two planes which are spaced apart from each other in the longitudinal direction of the main manifold channel, and wherein the outlet openings are located,
   1) in the longitudinal direction of the main manifold channel, between the two planes of the at least two transfer openings;
   2) in a third plane that is arranged perpendicular to the longitudinal direction of the main manifold channel; or
   3) in a third plane that is arranged perpendicular to the longitudinal direction of the main manifold channel and between the two planes of the at least two transfer openings.

2. The manifold device as claimed in claim 1, characterized in that the at least two transfer openings adjacent in circumferential direction open into the main manifold channel at different heights.

3. The manifold device as claimed in claim 1, characterized in that the at least two transfer openings do not overlap on the inner circumference of the main manifold channel.

4. The manifold device as claimed in claim 1, characterized in that the number of the at least two transfer openings that each open into the main manifold channel on a respective plane is equal.

5. The manifold device as claimed in claim 1, characterized in that the planes in which the at least two transfer openings open into the main manifold channel are arranged parallel to each other.

6. The manifold device as claimed in claim 1, characterized in that the planes are arranged perpendicular to the longitudinal direction of the main manifold channel.

7. The manifold device as claimed in claim 1, characterized in that the manifold device is configured to taper conically toward the inlet opening counter to the longitudinal direction.

8. The manifold device as claimed in claim 1, characterized in that the manifold device has, in the longitudinal direction, an outer cross section that remains constant at least in part.

9. An injection-molding nozzle for an injection-molding tool comprising: a nozzle body and with at least two mouthpieces which are each fluidically connected, via an outlet opening, to a mold cavity of the injection-molding tool formed in a mold insert, wherein a flow channel for an injection-molding compound to be processed is formed in the nozzle body, and with a manifold device as claimed in claim 1, wherein the flow channel opens into the main manifold channel of the manifold device and the manifold channels each open into a mouthpiece of the at least two mouthpieces.

10. The injection-molding nozzle as claimed in claim 9, characterized in that the at least two mouthpieces are arranged in a receiving device formed separately from the nozzle body, and in that the manifold device forms a holding element that secures the at least two mouthpieces releasably in the separate receiving device.

11. The injection-molding nozzle as claimed in claim 10, characterized in that the manifold device is arranged longitudinally displaceably in the receiving device.

12. An injection-molding tool comprising an injection-molding nozzle as claimed in claim 9.

* * * * *